(12) United States Patent
Wedekind

(10) Patent No.: US 7,568,772 B2
(45) Date of Patent: Aug. 4, 2009

(54) WIND ENERGY PLANT WITH A HYDRAULICALLY ACTUATED ROTOR BRAKE AND METHOD FOR THE HYDRAULIC CONTROL OF A ROTOR BRAKE

(75) Inventor: Christian Wedekind, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/775,981

(22) Filed: Jul. 11, 2007

(65) Prior Publication Data
US 2008/0164752 A1 Jul. 10, 2008

(30) Foreign Application Priority Data
Jan. 10, 2007 (DE) .................. 10 2007 002 136

(51) Int. Cl.
B60T 13/22 (2006.01)
(52) U.S. Cl. .................. 303/2; 303/3; 60/422
(58) Field of Classification Search .......... 303/2, 303/3, 15; 60/413, 422
See application file for complete search history.

(56) References Cited

U.S. PATENT DOCUMENTS 6,254,197 B1 * 7/2001 Lading et al. .................. 303/2
6,477,836 B1 * 11/2002 Bianchetta et al. ............ 60/422

FOREIGN PATENT DOCUMENTS

| DE | 27 45 276 A1 | 3/1978 |
| DE | 10 2004 057 522 A1 | 4/2006 |
| DE | 10 2004 057 739 A1 | 4/2006 |
| DE | 103 20 580 A1 | 11/2006 |

OTHER PUBLICATIONS

Windkraftanlagen, 3rd Edition, by Erich Hau, Springer-Verleg Verlin, Chapter 8.7. pp. 287-289.

* cited by examiner

Primary Examiner—Christopher P Schwartz
(74) Attorney, Agent, or Firm—Vidas, Arrett & Steinkraus, P.A.

(57) ABSTRACT

A method for controlling a hydraulically actuated rotor brake for a drive train of a wind energy plant, wherein the rotor brake is realized as an active rotor brake, which exerts a braking moment getting stronger when the hydraulic pressure increases, wherein in a first phase, a brake cylinder is pressurized with a first pressure via a first pressure reducing valve, in a second phase, the brake cylinder is pressurized with a second pressure via a second pressure reducing valve, and a switchover equipment is provided, which switches over from the first pressure to the second pressure.

19 Claims, 2 Drawing Sheets

WIND ENERGY PLANT WITH A HYDRAULICALLY ACTUATED ROTOR BRAKE AND METHOD FOR THE HYDRAULIC CONTROL OF A ROTOR BRAKE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind energy plant with a hydraulically actuated rotor brake and a method for the hydraulic control of a rotor brake.

Wind energy plants have a rotor brake in the drive train. The rotor brake is mostly arranged behind the gearbox, and in wind energy plants with an active pitch adjustment, it serves for the purpose of an additional brake system, which holds the rotor of the wind energy plant being at standstill in its position.

Erich Hau points out in Windkraftanlagen, $3^{th}$ edition, Springer-Verlag Berlin, Chapter 8.7, the entire contents of which is incorporated herein by reference, that braking the rotor to stand still is unavoidable for maintenance and repair works, and is in general also usual during the normal standstill periods. With respect to the function of the rotor brake in the operation, it is further pointed out that the same is limited to the pure holding function at rotor standstill in the simplest case. It is said that the brake must be dimensioned for the required holding moment of the rotor at standstill in this case, In addition to its function as a pure holding brake, the rotor brake might in principle also be dimensioned as a service brake, provided that the braking moment and the braking power (thermal load) are sufficient.

In wind energy plants in which the rotor brake is a part of the safety system, the braking system is realised as a passive brake or as a so-called FailSafe-brake. This means that the brake has to be pressurised in order to reduce the braking moment bearing on or in order to release the brake completely. The braking moment of the passive brake is achieved by a spring assembly, which pretensions the assigned brake shoes into the braking position. The braking moment applied in doing so is generated by the elastic force exerted by the spring elements. Due to this, it is necessary to provide correspondingly great spring assemblies in the brake for a wind energy plant, which necessitates a strong braking moment. The passive rotor brake described above is released by introducing a hydraulic fluid into the brake cylinder, for instance. The hydraulic fluid is introduced into the brake cylinder such that its pressure acts against the force of the spring assembly.

In contrast to the passive brakes described above, active brakes for wind energy plants are also known, in which the braking moment is not applied via a spring assembly, but instead at increasing hydraulic pressure the braking moment gets also stronger. The advantage of an active brake is that the same can be made smaller and that it is significantly more cost-saving. Also, a significantly greater braking moment is possible with an active brake.

The present invention is based on the objective to provide a method for the control of a hydraulically actuated rotor brake as well as a wind energy plant with a hydraulically actuated rotor brake, in which an active rotor brake is dimensioned both as a holding brake and as a service brake.

BRIEF SUMMARY OF THE INVENTION

The present invention is related to a method for the control of a hydraulically actuated rotor brake for the drive train of a wind energy plant. The rotor brake is realised as an active rotor brake, which applies a braking moment getting stronger when the hydraulic pressure in a brake cylinder increases, In the method according to the present invention, a brake cylinder is pressurised with a first pressure via a first pressure reducing valve in a first phase. The first phase of the braking process can be regarded as a phase in which the rotor brake intervenes as a service brake in support to a pitch system. In a second phase, the brake cylinder is pressurised with a second pressure via a second pressure reducing valve. In the second phase, the rotor brake might be used as a holding brake for the rotor when it stands still, for instance, According to the present invention, a switchover unit is provided for the active brake, which switches over from the first pressure to the second pressure. The switchover equipment in a hydraulically actuated brake with two separate pressure reducing valves for different pressures permits to use the hydraulically actuated brake as an active brake in a first and in a second phase of the braking process.

In a preferred embodiment of the method according to the present invention, a pressure system is provided which supplies hydraulic fluid for actuating the rotor brake in a fail-safe manner. The pressure system is equipped with a pump and hydraulic accumulators in a manner per se known, in order to be able to provide a sufficient amount of hydraulic fluid with a sufficiently great pressure even upon breakdown of the pump or breakdown of the complete electric supply or control of the wind energy plant, so that one or several braking processes can be reliably performed.

In this, the hydraulic system can be dimensioned such that additional consumers, like a pitch apparatus for instance, can also be supplied by the hydraulic system in a fail-safe manner.

In a preferred extension of the method according to the present invention, the switchover equipment switches over after standstill of the drive train. Practically, the pressure applied to the brake cylinder via the first pressure reducing valve is smaller than the pressure applied via the second pressure reducing valve. The two pressures of the pressure reducing valves generate corresponding braking moments via the brake cylinder.

Preferably, the pressure $(p_H)$ of the second pressure reducing valve sets at least one predetermined holding moment at the brake cylinder. Preferably, the predetermined holding moment appears for the rotor brake at environmental temperature. In this, it has to be taken into account that the rotor brake has an elevated temperature after use as a supporting service brake, and thus, it generates a significantly greater braking moment due to the temperature dependency of the frictional coefficient of the combination of brake lining and disc. Upon cooling down of the rotor brake, the braking moment applied is then reduced. Therefore, in the adjustment of the second pressure reducing valve, it must be taken care that the predetermined holding moment is generated after cooling down to environmental temperature of the rotor brake.

In order to make sure in the hydraulic actuation of the rotor brake that there is sufficient pressure in the pressure lines to the brake cylinder upon a malfunction in the system, upstream of each pressure reducing valve a 2/2-port valve is preferably connected in the pressure line, which is spring-pretensioned into its open position.

When the supply voltage for the 2/2-port valves breaks down, they lead the system pressure to the pressure reducing valves, which reduce the system pressure and forward it to the brake cylinder.

In a preferred embodiment of the method according to the present invention, the switchover equipment triggers the switchover after a predetermined period of time. In this, the predetermined period of time is selected such that it is greater than the period of time which is necessary to brake down the rotor to its standstill.

In a preferred embodiment, the switchover equipment is actuated hydraulically. Alternatively, it is also possible to actuate the switchover equipment electrically.

The wind energy plant according to the present invention has a hydraulically actuated rotor brake for the drive train, which is realised as an active rotor brake. The active rotor brake applies a braking moment which gets stronger when the hydraulic pressure increases. The wind energy plant has a first and a second brake unit, which each have a pressure reducing valve at a time, via which a brake cylinder is pressurised. Further, a switchover equipment is provided for the wind energy plant according to the present invention, which switches over from the pressure of the first brake unit to the pressure of the second brake unit. Thus, the active rotor brake is suited to be used as a supporting service brake and to serve as a holding brake as well.

Preferably, the wind energy plant according to the present invention is equipped with a fail-safe pressure system, which provides hydraulic fluid for actuating the rotor brake. Such a fail-safe pressure system has a sufficiently large hydraulic accumulator, in order to provide hydraulic fluid in a sufficient amount and with sufficient system pressure for the actuation of the rotor brake even when there is a voltage breakdown or a pump breakdown, respectively. In the wind energy plant according to the present invention, switchover is performed after standstill of the drive train. Through the switchover, it is changed over from the pressure of the first brake unit to the pressure of the second brake unit, the pressure of the first brake unit being smaller than the pressure of the second brake unit in this. For this purpose, a first pressure reducing valve is provided in the first brake unit, which reduces an existing system pressure more strongly than a pressure reducing valve in the second brake unit.

Preferably, the pressure reducing valve of the second brake unit is dimensioned such that a braking moment is generated on the brake cylinder which is at least equivalent to a predetermined holding moment. As the braking moment decreases due to the frictional coefficient when the rotor brake cools down, the predetermined holding moment is dimensioned such that at environmental temperature, at least the holding moment required for the rotor is applied.

In a preferred embodiment, a 2/2-port valve is connected before each pressure reducing valve, which is pretensioned into a position connecting the input and the output lines. The pretensioned 2/2-port valves make sure that the pressure line is free when there is a failure in the control, and thus, a sufficient system pressure for the actuation of the brake cylinder is at hand.

In a preferred embodiment, the switchover unit is realised hydraulically and it actuates the 2/2-port valve of the second brake unit hydraulically. Alternatively, it is also possible that the switchover unit actuates the 2/2-port valve of the second brake unit electrically.

In order to release the brake again, a 2/2-port valve is provided in a pressure line to the brake cylinder, which connects the supply lines with the tank in its pass-through position, wherein the 2/2-port valve (48) is pretensioned into its locking position.

BRIEF DESCRIPTION OF THE SEVERAL VIEWS OF THE DRAWINGS

The present invention is explained in more detail in the following, by means of an example of its realisation.

DETAILED DESCRIPTION OF THE INVENTION

Figure 1:
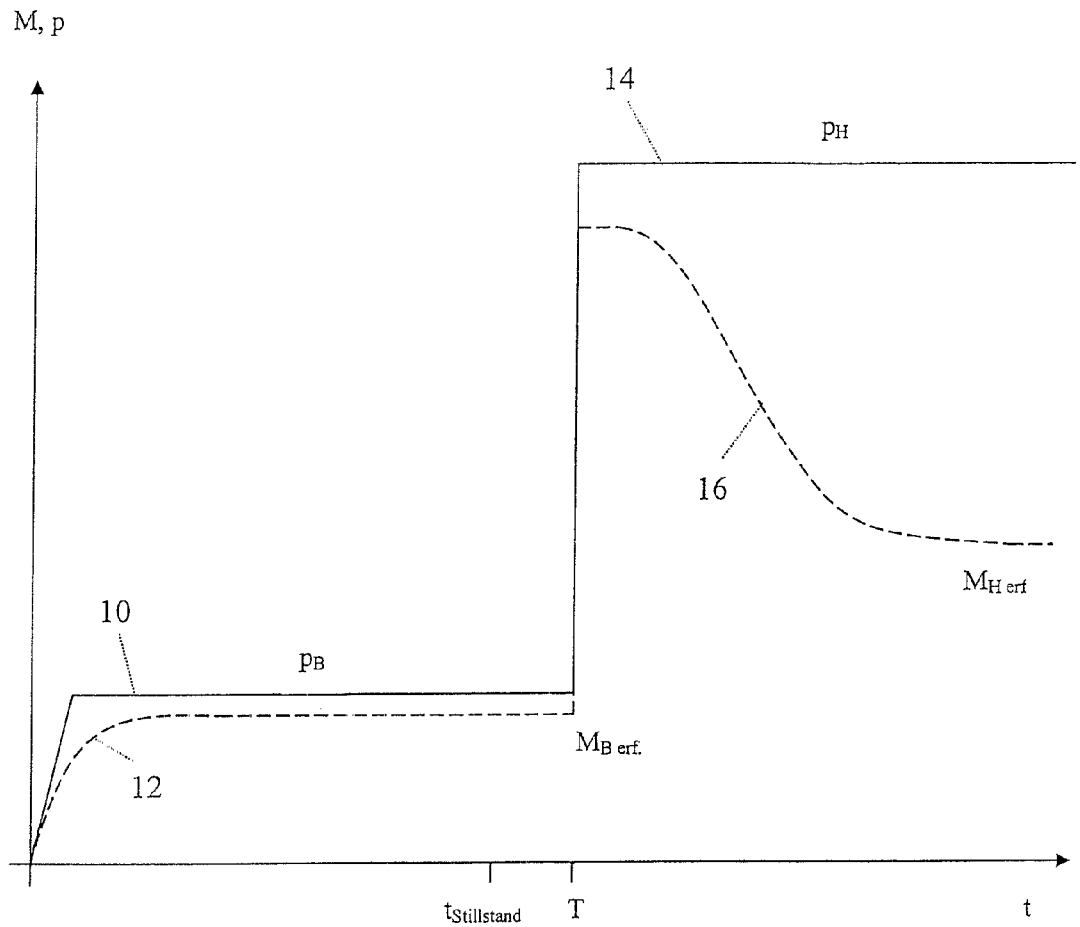
FIG. 1 shows the course in time of the moments in an active, hydraulically actuated rotor brake according to the present invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows the course of pressure p and braking moment M with time. In the rotor brake according to the present invention, a brake pressure 10 is applied to a brake cylinder in a first phase. The brake pressure results in the increasing braking moment 12, by which the brake engages and brakes down the drive train. The service brake with the brake pressure 10 is continued up to a predetermined time T. In this, the time T is greater than the expected standstill time $t_{Stillstand}$. Up to the point in time $t_{Stillstand}$, the rotor of the wind energy plant is brought to standstill by using its pitch system and the applied braking moment 12.

At the point in time T, it is switched over in the hydraulics, and from now on the holding pressure 14 is applied to the brake cylinder. As the brake has warmed up itself during the first phase, the holding pressure 14 results in a braking moment 16, which subsequently declines with the cooling of the rotor brake and which reaches or exceeds the required holding moment for the brake when the rotor brake is cooled down. In this, the holding pressure 14 is constantly applied to the brake cylinder.

Figure 2:
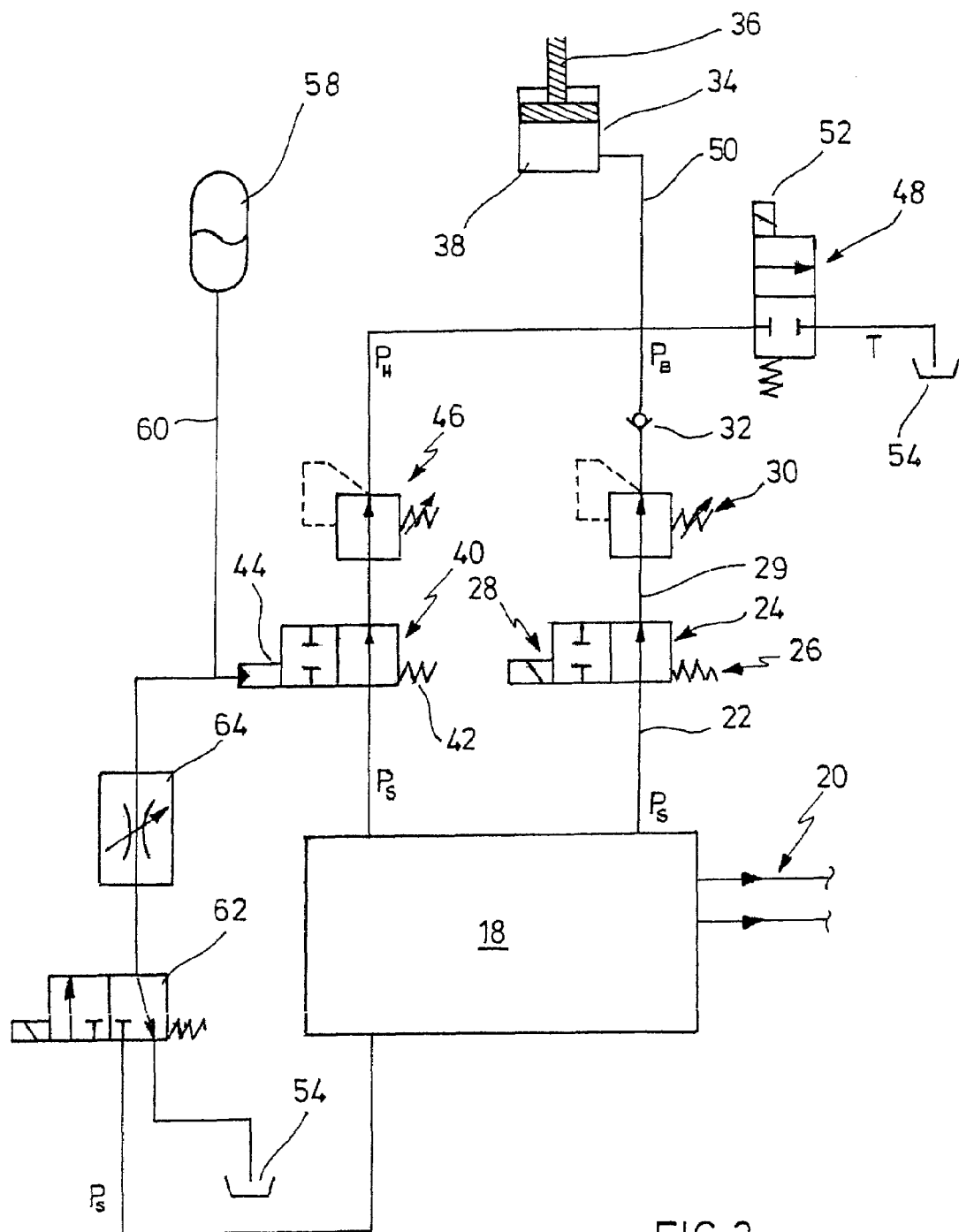
FIG. 2 shows the structure of the hydraulics for a rotor brake.

FIG. 2 shows the structure of the hydraulic actuation of the rotor brake in an exemplary manner's. For this purpose, a pressure system 18 is provided, which is equipped with a pump and accumulators in order to deliver a hydraulic fluid with sufficient pressure. For the sake of better overview, lines leading backward or control lines are not depicted in FIG. 2. The pressure system 18 may also have additional pressure lines 20, by which further systems of the wind energy plant can be actuated, like the pitch drive for instance.

A first pressure line 22 leads to a first 2/2-port valve 24. The 2/2-port valve 24 is shown in its nonflow position, into which it is pretensioned via a spring 26. Via an electromagnetic actuation unit 28, the 2/2-port valve 24 is brought into its locked position. In the locked position, the pressure remains in the pressure line. The pressure line 29 departing from the 2/2-port valve 24 is connected to a pressure reducing valve 30. Pressure reducing valves are sometimes also designated as pressure decreasing valves and are realised as directly controlled or pre-controlled slide gate valves.

In the pressure reducing valve 30, the system pressure $p_S$ is applied to the input line, which generates a force on a plane of the valve element. Via a so-called pressure balance, the desired brake pressure $p_B$ appears on the output of the pressure reducing valve 30. Downstream of the pressure reducing valve 30, a check valve 32 is provided, which prevents backflow of hydraulic fluid via the pressure reducing valve 30. The brake pressure $p_B$ is applied to a brake cylinder 34 via a pressure line. The brake cylinder 34 has a movable piston 36, which exerts a force upon the brake linings and causes the actuation thereof through the pressure in the cylinder chamber 38. 2/2-port valve 24 and pressure reducing valve 30 together form the first brake unit for the rotor brake of the present invention, which can be used as a supporting service brake.

The second brake unit has a second 2/2-port valve 40, which is pretensioned via a spring 42 into its open position. In its second position, the second 2/2-port valve 40 locks. The shifting of the second 2/2-port valve 40 takes place via a hydraulic actuation 44, which is triggered by the switchover equipment. Downstream of the second 2/2-port valve 40, a pressure reducing valve 46 is provided, on the output of which there is the holding pressure $p_H$. As the holding Pressure $p_H$ is greater than the brake pressure $P_B$, the check valve 32 locks and the holding pressure is applied to the brake cylinder 34.

When using a 3-port pressure reducing valve, the check valve 32 prevents the pressure limitation. Additional check valves may also be provided in order to maintain a sufficient pressure in the rotor brake and to avoid leakages when there is a breakdown.

The supply line towards the brake cylinder is in addition connected with a 2/2-port valve 48. In its nonflow position, the 2/2-port valve 48 is locked and can be brought into its open position through its electromagnetic actuation unit 52. In the open position, the supply line towards the brake cylinder is connected to the tank 54 in order to pressure-balance the brake cylinder. The tank 54 may be a constituent part of the pressure system 18.

Switchover between the brake pressure $p_B$ and the holding pressure $p_H$ takes place through the hydraulic actuation 44 unit on the second 2/2-port valve 40. For the actuation, an accumulator 58 is provided, which is brought to system pressure via a pressure line 60. In the depicted nonflow position of the 2/2-port valve 62, the accumulator 58 is connected to the tank 54. In this, a flow control valve 64 is connected into the pressure line 60. The flow control valve 64 controls the flow of the hydraulic fluid from the accumulator 58 into the tank 54. During the flow of the hydraulic fluid out of the accumulator 58, the pressure in the pressure line 60 decreases, and with this also at the actuating unit 44. When it has fallen below a predetermined pressure value, the second hydraulic fluid 40 is brought into its open position, and the holding pressure $p_H$ is present on the brake cylinder 34.

In order to bring the accumulator 58 to system pressure again when the brake is released, the 3/2-port valve 62 is brought into its second position in which the accumulator 58 is connected to the pressure system 18, in order to reach the system pressure again.

In the hydraulic switchover equipment depicted in FIG. 2, the time delay up to the point in time T can also be realised by an electric timing element. In this case, the hydraulically pre-controlled valve 40 is replaced with an electrically actuated 2/2-port valve In order to ensure the time delay even in the case of voltage breakdown, an autonomous electric supply of the timing element has to be provided. The same has to work reliably even upon malfunction, through a connected bus system for instance. For this purpose, a separate interruption-safe electric supply can be used, for instance. The use of a capacitor for storing electric energy for the period of time of the desired time delay between braking pressure and holding pressure is also possible.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims), In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for controlling a hydraulically actuated rotor brake for a drive train of a wind energy plant, wherein the rotor brake is realised as an active rotor brake, which exerts a braking moment getting stronger when the hydraulic pressure increases, wherein in a first phase, a brake cylinder (34) is pressurised with a first pressure (pB) via a first pressure reducing valve (30), in a second phase, the brake cylinder (34) is pressurised with a second pressure (pH) via a second pressure reducing valve (46), and a switchover equipment is provided, which switches over from the first pressure to the second pressure, wherein the pressure (pB) of the first pressure reducing valve (30) is smaller than the pressure (pH) of the second pressure reducing valve (46).

2. A method according to claim 1, characterised in that the pressure system provides hydraulic fluid for actuating the rotor brake in a fail-safe manner.

3. A method according to claim 1, characterised in that the switchover equipment switches over after standstill of the drive train.

4. A method according to claim 1, characterised in that the pressure (pH) of the second pressure reducing valve sets at least one predetermined holding moment at the brake cylinder (34).

5. A method according to claim 4, characterised in that the predetermined holding moment appears for the rotor brake at environmental temperature.

6. A method according to claim 1, characterised in that the switchover equipment switches over the switchover valve (40) after a predetermined period of time (T).

7. A method according to claim 6, characterised in that the switchover equipment is actuated hydraulically.

8. A method according to claim 1, characterised in that a 2/2-port valve is connected upstream of each of the pressure reducing valves, which is spring-pretensioned to an open position.

9. A method according to claim 1, characterised in that the switchover equipment is actuated electrically.

10. A wind energy plant with a hydraulically actuated rotor brake for the drive train, which is realised as an active rotor brake which exerts a braking moment getting stronger when the hydraulic pressure increases, wherein a first and a second brake unit, each one having a pressure reducing valve (30, 46), via which a brake cylinder (34) is pressurised with a pressure (pB, pH), and a switchover equipment, which switches over from the pressure (pB) of the first brake unit and the pressure (pH) of the second brake unit, wherein the pressure (pB) of the first pressure reducing valve (30) is smaller than the pressure (pH) of the second pressure reducing valve (46).

11. A wind energy plant according to claim 10, characterised in that the pressure reducing valve (30) of the first brake unit reduces an existing system pressure (pS) more strongly than a pressure reducing valve (46) of the second brake unit.

12. A wind energy plant according to claim 11, characterised in that the pressure reducing valve (46) of the second brake unit is dimensioned to generate a braking moment with the brake cylinder which is at least equivalent to a predetermined holding moment.

13. A wind energy plant according to claim 12, characterised in that at the environmental temperature of the rotor brake, the braking moment of the second brake unit is at least equivalent to the predetermined holding moment.

14. A wind energy plant according to claim 10, characterised in that a 2/2-port valve is connected before each pressure reducing valve, which is pretensioned into a pass-through position for the pressure line.

15. A wind energy plant according to claim 14, characterised in that the switchover equipment actuates the 2/2-port valve of the second brake unit hydraulically.

16. A wind energy plant according to claim 14, characterised in that the switchover equipment actuates the 2/2-port valve of the second brake unit electrically.

17. A wind energy plant according to claim 10, characterised in that a fail-safe pressure system (18) is provided which provides hydraulic fluid for actuating the rotor brake.

18. A wind energy plant according to claim 10, characterised in that the switchover equipment switches over after standstill of the drive train.

19. A wind energy plant according to claim 10, characterised in that a 2/2-port valve connects a pressure line (50) to the brake cylinder (34) with a tank (54), wherein the 2/2-port valve (48) is pretensioned into its locking position.

* * * * *